United States Patent
Li

(10) Patent No.: US 6,615,121 B2
(45) Date of Patent: Sep. 2, 2003

(54) VEHICLE REVERSING SENSOR DEVICE

(76) Inventor: Shih-Hsiung Li, 7F-5, No. 23, Sec. 1, Hangchow S. Rd., Taipei (TW)

( * ) Notice: Subject to any disclaimer, the term of this patent is extended or adjusted under 35 U.S.C. 154(b) by 0 days.

(21) Appl. No.: 10/033,268

(22) Filed: Oct. 19, 2001

(65) Prior Publication Data

US 2003/0078710 A1 Apr. 24, 2003

(51) Int. Cl.[7] .................................................. G08G 1/00
(52) U.S. Cl. .................. 701/36; 701/301; 702/159; 340/903
(58) Field of Search .......................... 701/36, 301, 117, 701/118, 207, 220, 223, 225; 702/159; 367/909; 340/436, 903, 435

(56) References Cited

U.S. PATENT DOCUMENTS 4,561,064 A * 12/1985 Bruggen et al. ............ 702/159

* cited by examiner

Primary Examiner—Thomas G. Black
Assistant Examiner—Arthur D. Donnelly
(74) Attorney, Agent, or Firm—Pearne & Gordon LLP

(57) ABSTRACT

A vehicle reversing sensor device includes a power plug for obtaining power from a vehicle, a control box connected to the power plug and having a control circuit provided therein, and at least one vehicle reversing sensor electrically connected with the control circuit. The vehicle reversing sensor is mounted on a reverse light of the vehicle to detect whether there is light emitted from the reverse light or not. When the vehicle reversing sensor detects there is light emitted from the reverse light, the reversing sensor outputs detecting signals, otherwise, the reversing sensor is not activated.

4 Claims, 5 Drawing Sheets

VEHICLE REVERSING SENSOR DEVICE

BACKGROUND OF THE INVENTION

1. Field of the Invention

The present invention relates to a vehicle reversing sensor device, and more particularly to a vehicle reversing sensor device that is easy to be installed in a vehicle. The vehicle reversing sensor is installed in a reversing light of the vehicle, whereby the reversing sensor is able to be activated by optical signal emitted from the reversing light.

2. Description of Related Art

Nowadays, a vehicle reversing sensor is popularly applied in an automobile to assist a driver for detecting whether any obstacles exist behind the automobile when backing the automobile up.

The structure improvement of the reversing sensor is for increasing its accuracy and sensitivity so as to avoid the abnormal operation and to extend the detecting area. Although such an improvement is helpful, another important point that needs to be considered is the installation of the vehicle reversing sensor.

Conventionally, a reverse gear shift controls whether the vehicle reversing sensor is activated or not. An automobile mechanic needs to find a power supply wire in a vehicle, and then electrically connects the power supply wire with the vehicle reversing sensor. When the driver engages the reverse gear, the reversing sensor will be activated.

However, the foregoing installation of the reversing sensor is too difficult for a lay person and even a professional automobile mechanic still needs to spend a lot of time to find out the correct power supply wire because of the different specifications of automobiles.

To overcome the shortcomings, the present invention tends to provide a vehicle reversing sensor that is easy for any user to install in a vehicle so as to mitigate and obviate the aforementioned problems.

SUMMARY OF THE INVENTION

The primary objective of the invention is to provide a vehicle reversing sensor device that is easy to install in a vehicle.

In order to accomplish the objective, the vehicle reversing sensor includes a housing defined with a chamber, an ultra-sound transceiver and an optical detector both received in the chamber, and a transparent cover sealing the chamber. When the vehicle reversing sensor is installed in a reverse light of the vehicle, the optical detector is able to detect the optical signal emitted from the reverse light so as to activate the ultra-sound transceiver.

Other objects, advantages and novel features of the invention will become more apparent from the following detailed description when taken in conjunction with the accompanying drawings.

DETAILED DESCRIPTION OF THE PREFERRED EMBODIMENT

Figure 1:
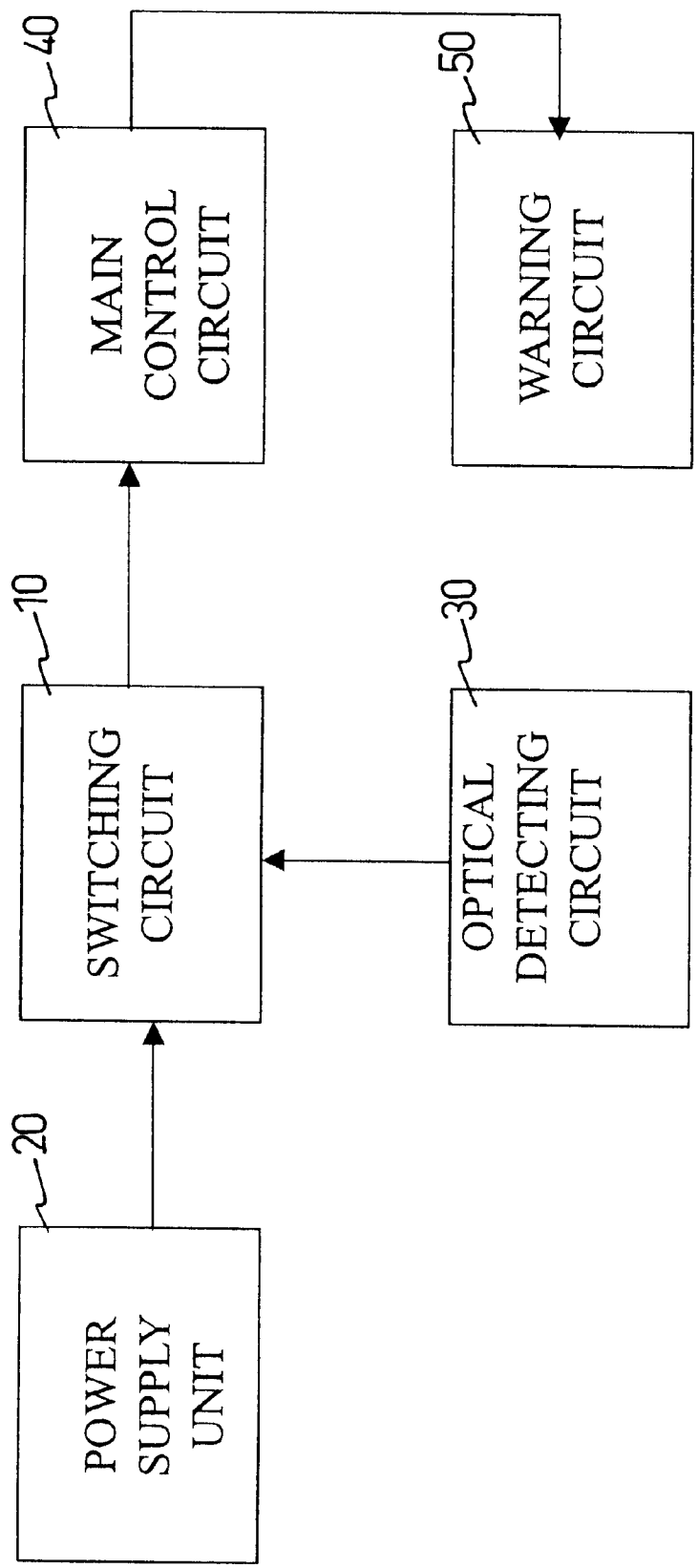
FIG. 1 is a circuit block diagram of a vehicle reversing sensor device of the present invention.

With reference to FIG. 1, a circuit diagram of a vehicle reversing sensor device in accordance with the present invention includes a switching circuit (10) connected with a power supply unit (20) and an optical detecting circuit (30), wherein the switching circuit (10) has an output connected through a main control circuit (40) to a warning circuit (50).

The operation of the foregoing circuit diagram is as following. When a vehicle is driven forward, since a reverse light of the vehicle is not activated, the switching circuit (10) is off, thus the main control circuit (40) is unable to obtain the power from the power supply unit (20). Therefore the main control circuit (40) is not in a detection mode.

On the contrary, when the vehicle is backing up, the reverse light is turned on and emits light. Once the optical detecting circuit (30) detects there is light emitted from the reverse light, the optical detecting circuit (30) controls the switching circuit (10) to turn on. Since the switching circuit (10) is turned on, the power supply unit (20) provides power to the main control circuit (40), so that the main control circuit (40) starts to function and emits ultra-sound signal to detect whether an obstacle exists or not. If there is an obstacle, the main control circuit (40) will drive the warning circuit (50) to generate alarm sounds.

Figure 2:
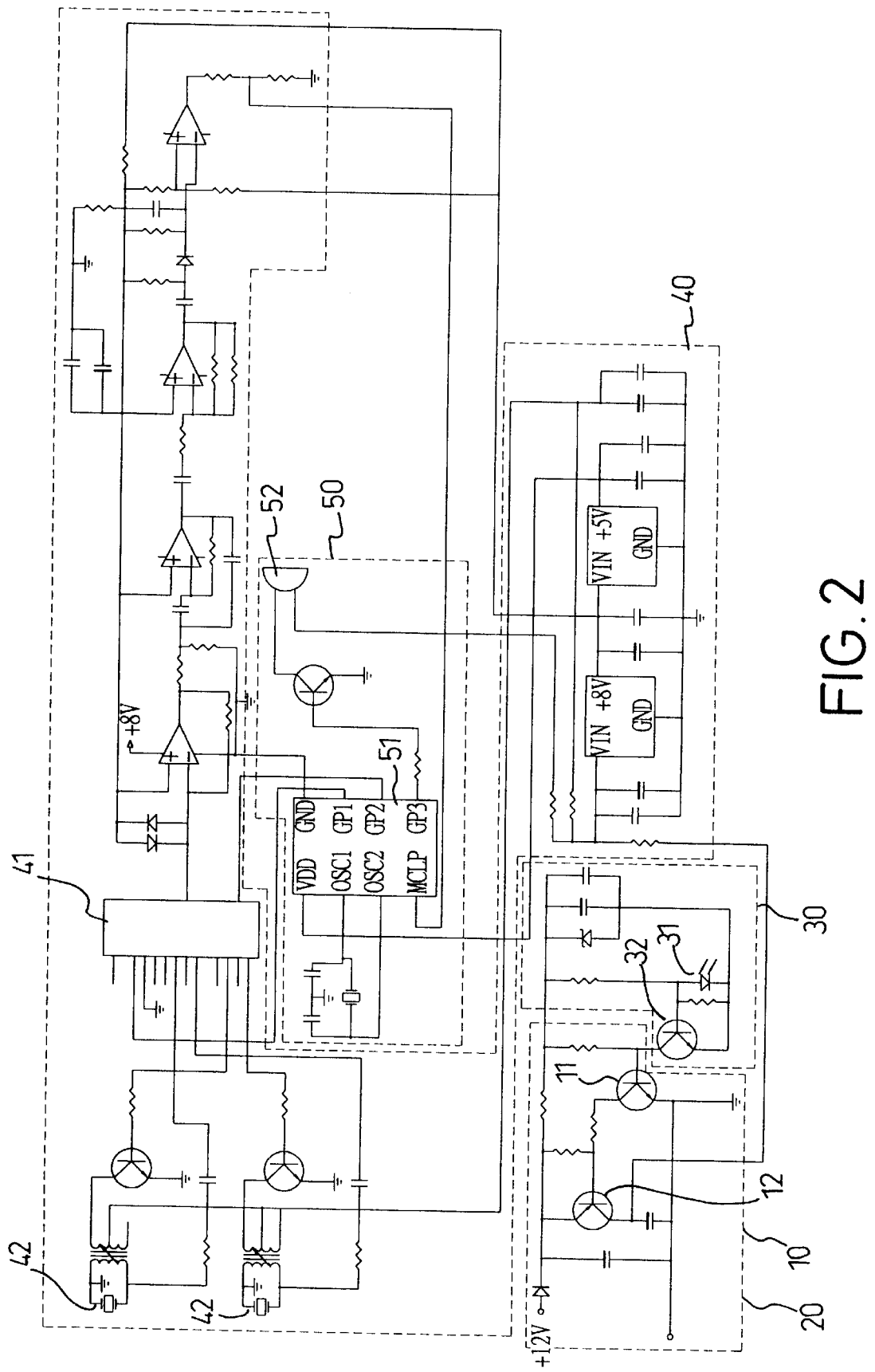
FIG. 2 is a detailed circuit diagram of FIG. 2.

With reference to FIG. 2, a detailed circuit diagram of FIG. 1 is shown, and a detailed explanation of FIG. 2 is disclosed hereinafter. The switching circuit (10) mainly comprises a PNP transistor (12) connected with the power supply unit (20), and a first NPN transistor (11) connected to the PNP transistor (12). The optical detecting circuit (30) is mainly made up of an optical detecting element (31) and a second NPN transistor (32), wherein a photo diode is used as the optical detecting element (31) in this embodiment for detecting whether any light is input or not. The main control circuit (40) has a microprocessor (41), and two ultra-sound transceivers (42). The warning circuit (50) mainly comprises a driver IC (51) and a buzzer (52).

Because the vehicle reversing sensor of the present invention is installed in the reverse light of the vehicle, the resistance of the optical detecting element (31) is determined by the light emitted from the reverse light. If the optical detecting element (31) does not receive light from the reverse light, the resistance of the optical detecting element is high, and such a high resistance causes the second NPN transistor (32) to turn on. Once the second NPN transistor (32) is turned on, the first NPN transistor (11) and the PNP transistor (12) become turned off, and therefore the main control circuit (30) is unable to obtain the power from the power supply unit (20).

Contrarily, if the vehicle is reversing, the reverse light is activated. The optical detecting element (31) receives the light emitted from the reverse light, and the light causes the resistance of the optical detecting element (31) to decrease. Thus the second NPN transistor (32) is turned off. Once the second NPN transistor (32) is turned off, both the first NPN transistor (11) and the PNP transistor are turned on, whereby the power supply unit (20) provides power through the switching circuit (10) to the main control circuit (40). Once the microprocessor (41) in the main control circuit (40) receives the power, the microprocessor (41) drives the two ultra-sound transceivers (42) to emit ultra-sound signal for detecting. If the ultra-sound signal is reflected from an obstacle to the two ultra-sound transceivers (42), the microprocessor (41) receives the reflected signal and controls the driver IC (51) to output a signal to activate the buzzer (52) to generate alarm sounds so that the driver would know the existence of the obstacle.

Figure 3:
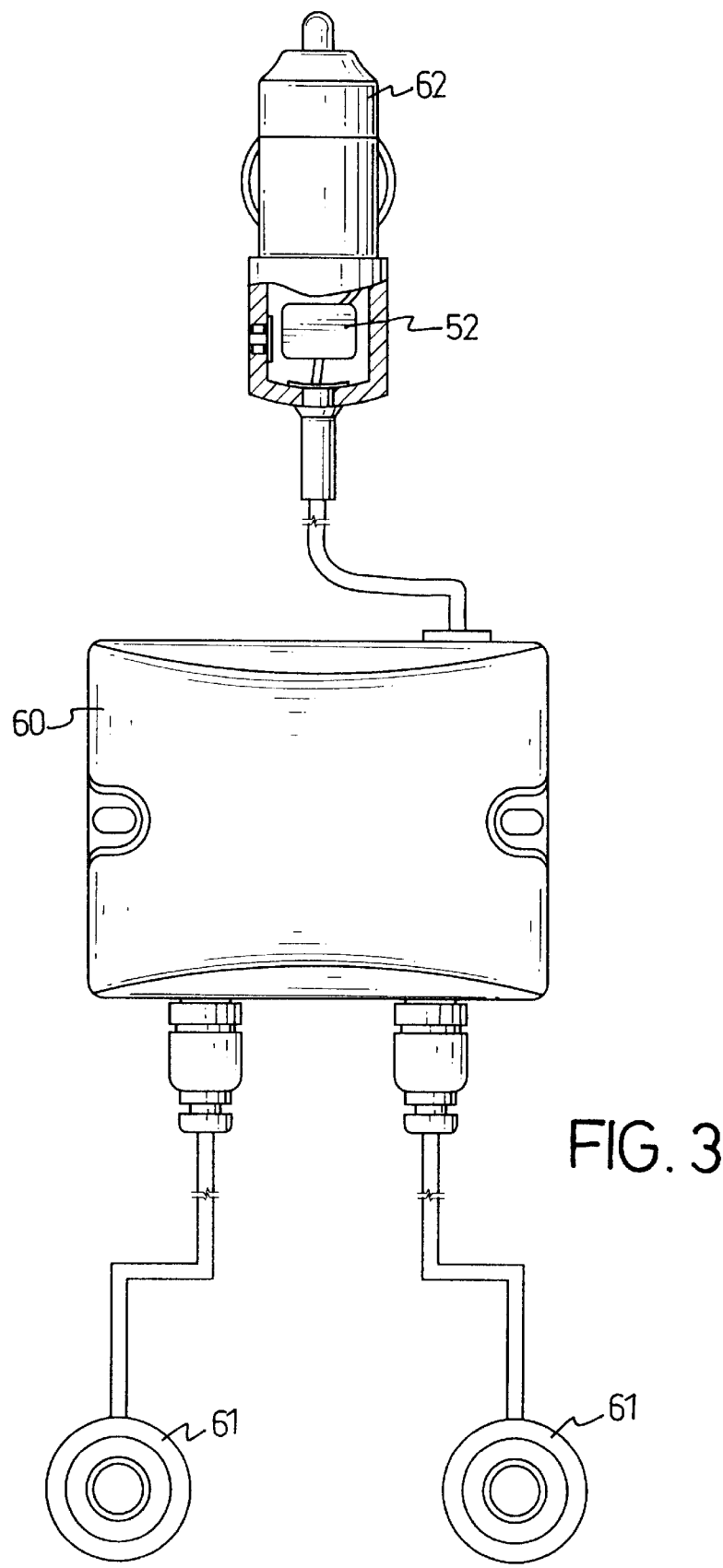
FIG. 3 is a preferred embodiment of the vehicle reversing sensor device of the present invention.

With reference to the FIG. 3, the vehicle reversing sensor device of the present invention comprises a control box (60) connected with two vehicle reversing sensors (61), wherein the foregoing circuit is provided inside the control box (60), and each reversing sensor (61) is installed with the optical detecting element (31) therein. The control box (60) is further electrically connected with a power plug (62) that is formed as a vehicle cigarette lighter shape, wherein the buzzer (52) is provided within the power plug (62). When the reversing sensors (61) are equipped in the vehicle, the reversing sensors (61) are attached on the reverse light to detect light, and the power plug (62) is inserted into a cigarette lighter socket of the vehicle to obtain a power supply.

Figure 4:
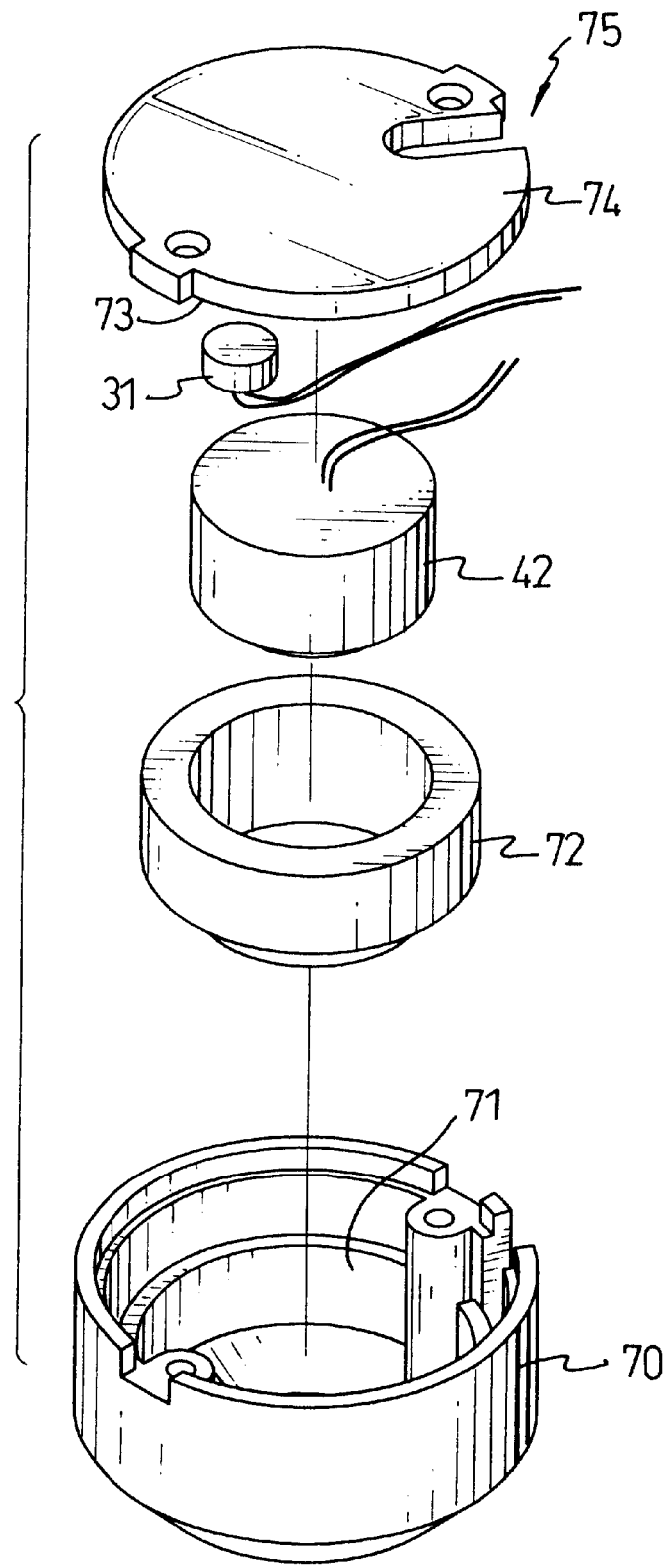
FIG. 4 is an exploded perspective view of a vehicle reversing sensor shown in FIG. 3 of the present invention.
Figure 5:
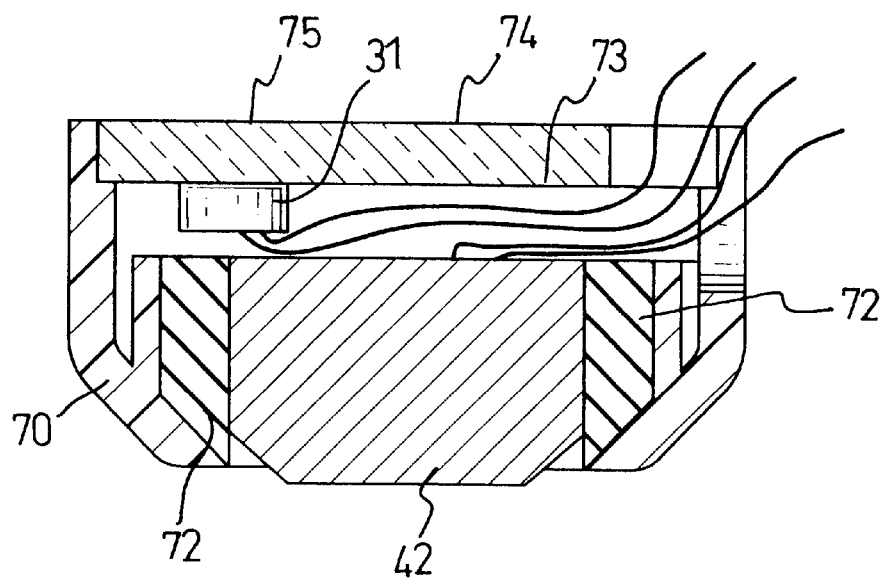
FIG. 5 is a cross-sectional view showing the vehicle reversing sensor of FIG. 4 in assembly.

With reference to FIGS. 4 and 5, the structure of the reversing sensor (61) shown in FIG. 3 is shown. The reversing sensor (61) comprises a housing (70) defined with a chamber (71), a silica ring (72) provided in the chamber (71), the ultra-sound transceiver (42) received in the silica ring (72), and the optical detecting element (31) mounted on a first side (73) of a transparent cover (75) that covers the chamber (71) of the housing (70) to enclose the optical detecting element (31) and the ultra-sound transceiver (42). When the reversing sensor (61) is installed in the reverse light, a second side (74) of the transparent cover (75) is mounted on the reverse light so that the optical detecting element (31) is able to detect the light from the reverse light.

From the foregoing description, when a user wants to install the present invention in a vehicle, the user just needs to mount the reversing sensors on the reverse light of the vehicle, and insert the power plug into the cigarette lighter socket in the vehicle. Obviously, such an installation is very easy and convenient for any person.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vehicle reversing sensor device comprising:

a power plug for adapting to obtain power from a vehicle;

a control box electrically connected with the power supply means and having a control circuit provided therein;

at least one vehicle reversing sensor electrically connected with and controlled by the control circuit, wherein the at least one vehicle reversing sensor comprises:
 a housing defined with a chamber;
 an ultra-sound transceiver securely provided in the chamber for emitting detecting signals and receiving the detecting signals reflected from an obstacle;
 an optical detecting element securely provided in the chamber for detecting light; and
 a transparent cover covering the chamber of the housing to enclose the ultra-sound transceiver and the optical detecting element in the housing;
 wherein the at least one vehicle reversing sensor is adapted to mount on a reverse light of the vehicle, when the reverse light is activated, the at least one vehicle reversing sensor detects light from the reverse light and emits the detecting signals to detect whether there is an obstacle or not.

2. The vehicle reversing sensor device as claimed in claim 1, wherein a buzzer is further provided in the power plug and electrically connected with the control circuit in the control box.

3. The vehicle reversing sensor device as claimed in claim 1, wherein the power plug is formed as a vehicle cigarette lighter shape and is adapted to insert in a cigarette lighter socket of a vehicle.

4. The vehicle reversing sensor device as claimed in claim 2, wherein the power plug is formed as a vehicle cigarette lighter shape and is adapted to insert in a cigarette lighter socket of a vehicle.

* * * * *